United States Patent Office 3,409,647
Patented Nov. 5, 1968

3,409,647
CERTAIN FLUORINATED CARBOXYLIC ACIDS
AND THEIR DERIVATIVES
Allen G. Pittman, El Cerrito, and William L. Wasley,
Berkeley, Calif., assignors to the United States of America as represented by the Secretary of Agriculture
No Drawing. Filed June 24, 1965, Ser. No. 466,865
12 Claims. (Cl. 260—408)

ABSTRACT OF THE DISCLOSURE

A fluoroketone is reacted with an alkali metal fluoride to convert the carbonyl radical of the ketone into an alkali metal fluorocarbinolate radical. The resulting intermediate is then reacted with an ester of an omega haloaliphatic acid, yielding a fluoroalkoxy aliphatic acid ester, particularly characterized by containing fluorine on the alpha carbon atom of the alkoxy moiety. Typical example: Hexafluoroacetone is reated with KF and the intermediate, potassium heptafluoroisopropylate, is reacted with ethyl 11-bromoundecanoate to prepare ethyl 11-(heptafluoroisopropoxy)undecanoate

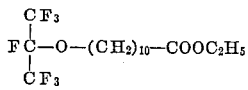

The esters may be applied to paper, fabrics, etc. to render them resistant to oils and water. Also, the esters may be converted into other derivatives such as the corresponding acids, salts, acid halides, amides, etc. For instance, the above-mentioned ester may be subjected to hydrolysis to produce the corresponding sodium salt, i.e., sodium 11-(heptafluoroisopropoxy)undecanoate which exhibits unusual surface activity.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for preparing fluorinated compounds; the provision of the compounds as new compositions of matter; and procedures for treating fibrous materials, especially textiles, with the compounds. Further objects of the invention will be evident from the following description wherein parts and percentages are by weight unless otherwise specified.

The novel carboxylic acids of the invention can be represented by the formula:

$$R_f\text{—}O\text{—}(CH_2)_m\text{—}COOH$$

wherein $R_f$ is a fluorinated monovalent aliphatic (open or closed chain) radical containing solely carbon and at least one element of the group consisting of hydrogen and halogen, which contains and is joined to the oxygen bridge (—O—) by a segment of the structure

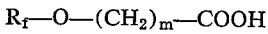

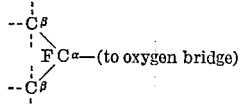

wherein the valences on the β carbon atoms are satisfied by at least 2 fluorine atoms and wherein m is an integer from 1 to 20.

The invention also includes, as novel compounds, the carboxyl-linked derivatives of the aforesaid carboxylic acids, namely, the salts, cationic complexes, acyl halides, amides, amidines, nitriles, hydrazides, and esters.

A particularly critical aspect of the compounds of the invention is the presence of the above-described segment in $R_f$. The unique structure of this segment provides the advantage that it confers a greater degree of oleophobicity for a given number of fluorinated carbon groups than with a straight-chain arrangement of —$CF_2$— groups. In fact, our investigations have indicated that 3 fluorinated carbon atoms in our segmental arrangement provide a degree of oleophobicity equivalent to 6 to 7 fluorinated carbons in a straight chain. Another important aspect of the invention is that the —O—$(CH_2)_m$— portion of the compounds provides effective isolation of the fluorinated radical ($R_f$) from the carboxyl group. As a result the products are stable and will undergo typical reactions of the carboxyl group, unaffected by the fluorine-containing "tail." Accordingly, the compounds can be converted into various carboxyl-linked derivatives as may be desired for a particular use—for example, preparing water-soluble derivatives which may be applied to substrates from aqueous solutions.

Although the aforesaid carboxylic acids may be considered as the fundamental structures, the corresponding esters are synthesized first in accordance with a novel technique forming a part of the present invention. The esters are then employed as a starting material from which to prepare the carboxylic acids or the carboxyl-linked derivatives thereof. Accordingly, we will describe first the synthesis of these esters:

In a preliminary step (described and claimed in our co-pending application, Ser. No. 398,129, filed Sept. 21, 1964), a fluoroketone is reacted with an alkali metal fluoride to convert the carbonyl radical of the ketone into an alkali metal fluorocarbinolate radical, that is, a fluorocarbinol group wherein the hydrogen of the hydroxyl radical is replaced by alkali metal. Thus

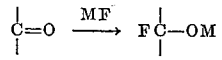

In the above formulas, M stands for an alkali metal.

The fluorocarbinolate intermediate is then reacted with an ester of an omega haloaliphatic acid $$X\text{—}(CH_2)_m\text{—}COOR'$$

to form the desired ester, as follows:

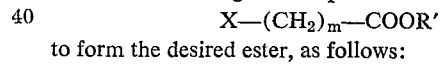

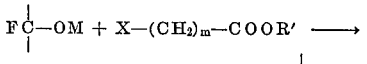

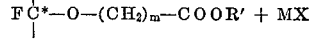

In the above formulas, M is an alkali metal; X is a halogen such as iodine, bromine, chlorine, or fluorine; m is an integer from 1 to 20; and R' is a monovalent hydrocarbyl radical, for example, alkyl, cycloalkyl, alkenyl, alkaryl, or aryl. The particular structure chosen for R' is unimportant; it is merely furnished to block the carboxyl group.

By this simple synthesis many different kinds of fluorinated esters can be prepared in high yields—often as high as 90%.

It is evident from the above formulas that the synthesis converts the carbonyl group to an ether linkage without requiring the use of a reducing agent and concomitantly a fluorine group is added, that is, the product contains a fluorine group on the alpha carbon atom of the alcohol moiety. (This carbon atom is indicated above by the asterisk.) This is an unusual and heretofore unknown type of structure which gives the products especially useful properties. For example, the products can be used to provide oil-, water-, and soil-repellent finishes on textiles and paper and the repellency attained is substantially greater than that achieved with the related compounds wherein the same position is occupied by hydrogen.

The process of the invention is by no means limited to the example above but is of great versatility and, generically, can be applied to any aliphatic (open-chain or closed-chain) ketone which contains at least two fluorine groups adjacent to the carbonyl group. In other words, the carbon atoms connected to the carbonyl group must contain at least two fluorine atoms—distributed on these carbon atoms symmetrically or asymmetrically. These fluorine groups are a critical item to activate the carbonyl group so that it will undergo the desired transformation when contacted with the alkali metal fluoride. Especially good results are obtained when the carbon atoms adjacent to the carbonyl radical contain halogen radicals (i.e., F, Cl, Br, or I) in addition to the minimum of two fluorine groups. In this connection it may be noted that although halogens of higher atomic weight than fluorine— i.e., Cl, Br, and I—are not effective by themselves to activate the carbonyl group, they can be employed to supplement the activating influence of fluorine groups. Beyond the positions adjacent to the carbonyl group, the structure of the ketone is of no criticality to the process and available sites may be occupied, for example, by hydrogen or halogen. In other words, the critical item for the process aspect of this invention is that the starting compound contain a carbonyl group activated by adjacent fluorine atoms as explained hereinabove; the remainder of the starting compound is not material to the process. Of course, this remainder may be limited in accordance with certain parameters to provide particular desired characteristics in the products. However, such limitation concerns the character of the ester product, not the operation of the process.

The esters produced in accordance with the invention may be used in many areas wherein esters in general are employed, i.e., as lubricants, plasticizers, and hydraulic fluids. Moreover, because of their content of fluorine, particularly the fluorine atom on the $\alpha$-carbon atom of the alcohol moiety, they are useful in such applications as oil and water repellants. Thus, by applying solutions of these esters to materials such as paper, fabrics, yarns, etc., these materials will resist the penetration of oils and water.

The esters of the invention are not only useful as such but also admirably serve as intermediates from which to prepare other derivatives. Accordingly, another phase of the invention concerns the conversion of the esters into various derivatives which retain the carboxyl radical. Typically, these derivatives may be acids, salts, cationic complexes, acyl halides, amides, amidines, nitriles, hydrazides, and esters. Techniques for preparing such derivatives are described in the following paragraphs.

The acids of the invention can be prepared from the above-described esters by the usual hydrolysis procedures. For example, the ester is refluxed with aqueous alkali (NaOH, KOH, or the like). The resulting solution of the salt is then acidified with HCl or other mineral acid to yield the desired carboxylic acid product.

The salts of the invention may be produced directly by hydrolysis of the above-described esters with aqueous alkali such as sodium or potassium hydroxide, or, they may be produced from the acid by neutralization with a desired base or by the usual metathetic reactions. The alkali metal salts are especially valuable as they exhibit surface active properties. For example, aqueous solutions of the alkali metal salts have low surface tensions, in some cases, markedly lower than attainable with conventional wetting agents. These compounds are therefore useful in applications where surfactants are generally employed as in dyeing and scouring textiles; in preparing emulsions; in conducting emulsion polymerizations (particularly of fluorine-containing monomers, because of their compatibility with other fluorinated compounds). The acids of the invention form salts with other cations: metal cations such as those of alkaline earth metals, aluminum, zinc, copper, iron, manganese, zirconium, etc.; the ammonium ion; and substituted ammonium ions such as ethylammonium, piperidinium, dimethylammonium, trimethylammonium, tetramethylammonium, tris ($\beta$-hydroxyethyl)ammonium, etc. Generally, the salts with the heavier and/or polyvalent metals such as aluminum, zirconium, barium, zinc, etc. are water-insoluble and may be employed to impart oleophobic and hydrophobic properties to various substrates such as paper, textiles, leather, etc. For this purpose these salts may be applied as such or be formed in situ as by serially contacting the substrate with a solution of a water-soluble polyvalent metal salt, e.g., aluminum chloride, then with a solution of an acid of the invention (or an alkali metal salt thereof). The acids of the invention may be utilized to form cationic complexes by application of known procedures, e.g., reaction of the acid with chromic chloride or chromyl chloride, preferably in the presence of ethanol or other low molecular weight alcohol. Such complexes are useful, for example, to impart water- and oil-repellency to leathers and may be applied by drumming the leather with an aqueous solution containing the chromium complex in a concentration of about 3% of the dry weight of the leather and containing enough formic acid to give the solution a pH of about 3.5 to 4.

The acids of the invention can be converted to the corresponding acyl halides, for example to the acyl chloride, by treatment with conventional halogenating agents such as phosphorus pentachloride or thionyl chloride. Other acyl halides may be prepared in similar manner from the acids directly or may be prepared from the acyl chlorides by replacement of a different halogen for the chloride. Typically, the acyl chloride may be treated with hydrogen fluoride to form the acyl fluoride; with calcium bromide or calcium iodide to form the corresponding acyl bromide or acyl iodide.

The acyl halides constitute especially valuable intermediates for preparing other derivatives in accordance with the invention. Typically, the acyl chlorides may be reacted with ammonia, primary amines, or secondary amines to yield, respectively, unsubstituted amides, monosubstituted amides, or disubstituted amides. The amides may, in turn, be used as intermediates for preparing the corresponding nitriles as by dehydrating the amides with $P_2O_5$, or the like. Amidines may be obtained by ammonolysis of the nitriles. Hydrazides may be prepared from the corresponding acyl chlorides or bromides by reaction with hydrazine.

The acyl halides may also be employed to produce esters, for example, by reaction thereof with a selected alcohol or phenol. Where the alcohol does not exist in stable form (e.g., vinyl alcohol) transesterification procedures may be employed. For example, a carboxylic acid of the invention (or the methyl or ethyl ester thereof) may be reacted with vinyl acetate in the presence of a catalyst such as mercuric acetate to yield the vinyl ester of the carboxylic. The vinyl, allyl, methallyl, etc. esters may be homopolymerized or copolymerized with other polymerizable monomers such as acrylic acid, methyl methacrylate, acrylonitrile, vinyl chloride or acetate by conventional polymerization techniques such as heating in the presence of a catalytic amount of a free-radical donor (e.g., $\alpha,\alpha'$-azobisisobutyronitrile). Typical in this area are the polymers containing recurring units of the structure

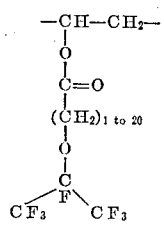

Typical examples of ketones to which the process of the invention may be applied and the corresponding products are given in the tables below, by way of illustration but not limitation. It will be noted that the products listed in these tables contain the common radical

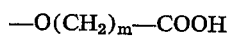

(where $m$ is an integer from 1 to 20). This designation of only the carboxylic acids of the invention is not meant to be restrictive but only illustrative. As heretofore explained, the invention encompasses not only the acids but also the carboxyl-linked derivatives thereof selected from the class consisting of salts, cationic complexes, acyl halides, amides, amidines, nitriles, hydrazides, and esters.

| Ketone (Starting compound) | Product (Carboxylic acid as example thereof) Note: $m$ is an integer from 1 to 20 |
|---|---|
| $CF_3-(CF_2)_n-\overset{O}{\underset{\|}{C}}-(CF_2)_{n'}-CF_3$ | $CF_3-(CF_2)_n-\overset{O-(CH_2)_m-COOH}{\underset{F}{C}}-(CF_2)_{n'}-CF_3$ |
| Wherein $n$ and $n'$ are each a number from 0 to 10 | |
| $(CF_3)_2CF-\overset{O}{\underset{\|}{C}}-CF(CF_3)_2$ | $(CF_3)_2CF-\overset{O-(CH_2)_m-COOH}{\underset{F}{C}}-CF(CF_3)_2$ |
| $CF_3-(CF_2)_n-\overset{O}{\underset{\|}{C}}-CF(CF_3)_2$ | $CF_3-(CF_2)_n-\overset{O-(CH_2)_m-COOH}{\underset{F}{C}}-CF(CF_3)_2$ |
| Wherein $n$ is a number from 0 to 18 | |
| $R-\overset{O}{\underset{\|}{C}}-CF(CF_3)_2$ | $R-\overset{O-(CH_2)_m-COOH}{\underset{F}{C}}-CF(CF_3)_2$ |
| Wherein R represents the heptafluorocyclobutyl radical | |
| $O=C\ (CF_3)_2$ (cyclic) | $HOOC-(CH_2)_m-O-\overset{}{\underset{}{C}}-F\ (CF_2)_n$ (cyclic) |
| Wherein $n$ is a number from 3 to 10 | |

COMPOUNDS CONTAINING OTHER HALOGEN ATOMS IN ADDITION TO FLUORINE

[Y is Cl, Br, or I]

| | |
|---|---|
| $YCF_2-\overset{O}{\underset{\|}{C}}-CF_3$ | $YCF_2-\overset{O-(CH_2)_m-COOH}{\underset{F}{C}}-CF_3$ |
| $YCF_2-\overset{O}{\underset{\|}{C}}-CF_2Y$ | $YCF_2-\overset{O-(CH_2)_m-COOH}{\underset{F}{C}}-CF_2Y$ |
| $Y_2CF-\overset{O}{\underset{\|}{C}}-CF_2Y$ | $Y_2CF-\overset{O-(CH_2)_m-COOH}{\underset{F}{C}}-CF_2Y$ |
| $Y_2CF-\overset{O}{\underset{\|}{C}}-CFY_2$ | $Y_2CF-\overset{O-(CH_2)_m-COOH}{\underset{F}{C}}-CFY_2$ |
| $CF_3-(CF_2)_n-\overset{O}{\underset{\|}{C}}-CF_2Y$ | $CF_3-(CF_2)_n-\overset{O-(CH_2)_m-COOH}{\underset{F}{C}}-CF_2Y$ |
| Wherein $n$ is a number from 0 to 18 | |
| $CF_3-(CF_2)_n-\overset{O}{\underset{\|}{C}}-CFY_2$ | $CF_3-(CF_2)_n-\overset{O-(CH_2)_m-COOH}{\underset{F}{C}}-CFY_2$ |
| Wherein $n$ is a number from 0 to 18 | |

COMPOUNDS CONTAINING HYDROGEN IN ADDITION TO FLUORINE

[$n$ and $n'$ are each a number from 1 to 18]

| | |
|---|---|
| $H(CF_2)_n-\overset{O}{\underset{\|}{C}}-(CF_2)_{n'}H$ | $H(CF_2)_n-\overset{O-(CH_2)_m-COOH}{\underset{F}{C}}-(CF_2)_{n'}H$ |
| $H(CF_2)_n-\overset{O}{\underset{\|}{C}}-(CF_2)_{n'}F$ | $H(CF_2)_n-\overset{O-(CH_2)_m-COOH}{\underset{F}{C}}-(CF_2)_{n'}F$ |
| $H(CF_2)_n-\overset{O}{\underset{\|}{C}}-CF(CF_3)_2$ | $H(CF_2)_n-\overset{O-(CH_2)_m-COOH}{\underset{F}{C}}-CF(CF_3)_2$ |
| $R-\overset{O}{\underset{\|}{C}}-C_nF_{2n}+1$ | $R-\overset{O-(CH_2)_m-COOH}{\underset{F}{C}}-C_nF_{2n}+1$ |

Wherein R represents an alkyl group containing 1 to 18 carbon atoms or a cycloalkyl group such as cyclopropyl, cyclobutyl, or cyclohexyl It is also within the broad scope of the invention to utilize, as the starting material, ketones containing more than one carbonyl group. By adjustment of the proportions of reactants in line with usual stoichiometrical relationships, diesters are produced. From these, dicarboxylic acids and other derivatives thereof may be prepared. Typical in this category are the following:

| Ketone | Product, carboxylic acid as example ($m$ is integer from 1 to 20) |
|---|---|
| $(CF_3)_2CF-\overset{O}{\underset{\|}{C}}-\overset{O}{\underset{\|}{C}}-CF(CF_3)_2$ | $HOOC-(CH_2)_m-O\quad O-(CH_2)_m-COOH$ $(CF_3)_2CF-\overset{}{\underset{F}{C}}-\overset{}{\underset{F}{C}}-CF(CF)$ |
| $(CF_3)_2CF\overset{O}{\underset{\|}{C}}-(CF_2)_3-\overset{O}{\underset{\|}{C}}-CF(CF_3)_2$ | $HOOC-(CH_2)_m-O\quad O-(CH_2)_m-COOH$ $(CF_3)_2CF\overset{}{\underset{F}{C}}-(CF_2)_3-\overset{}{\underset{F}{C}}-CF(CF_3)_2$ |

Generically, a preferred class of ketones which may be used in the process of the invention and the intermediates and the products formed therefrom may be represented by the following stuctures:

| (A) Ketone | (B) Alkali metal fluorocarbinolate | (C) Product (Carboxylic acid, as example) |
|---|---|---|
| $R-\overset{R}{\underset{R}{\overset{\|}{C}}}-R$ $\overset{\|}{C}=O$ $R-\overset{R}{\underset{R}{\overset{\|}{C}}}-R$ | $R-\overset{R}{\underset{R}{\overset{\|}{C}}}-R$ $F\overset{\|}{C}OM$ $R-\overset{R}{\underset{R}{\overset{\|}{C}}}-R$ | $R-\overset{R}{\underset{R}{\overset{\|}{C}}}-R$ $F\overset{\|}{C}-O-(CH_2)_m-COOH$ $R-\overset{R}{\underset{R}{\overset{\|}{C}}}-R$ |

Wherein each R represents a member of the group consisting of hydrogen, halogen, alkyl, haloalkyl, cycloalkyl, and halocycloalkyl, and wherein at least two of the R's are fluorine. M represents an alkali metal. The symbol $m$ is an integer from 1 to 20.

Particularly preferred in various applications, as in the treatment of fibrous materials, are the compounds derived from fluorinated acetones, i.e.:

| (A') Ketone | (B') Alkali metal fluorocarbinolate (M is alkali metal) | (C') Product, carboxylic acid, as example ($m$ is integer from 1 to 20) |
|---|---|---|
| $CF_3$ $\overset{\|}{C}=O$ $CF_3$ | $CF_3$ $F\overset{\|}{C}-OM$ $CF_3$ | $CF_3$ $F\overset{\|}{C}-O-(CH_2)_m-COOH$ $CF_3$ |
| $CF_2Cl$ $\overset{\|}{C}=O$ $CF_3$ | $CF_2Cl$ $F\overset{\|}{C}-OM$ $CF_3$ | $CF_2Cl$ $F\overset{\|}{C}-O-(CH_2)_m-COOH$ $CF_3$ |
| $CF_2Cl$ $\overset{\|}{C}=O$ $CF_2Cl$ | $CF_2Cl$ $F\overset{\|}{C}-OM$ $CF_2Cl$ | $CF_2Cl$ $F\overset{\|}{C}-O-(CH_2)_m-COOH$ $CF_2Cl$ |

Regarding the products shown above in columns C and C′, the representation of the carboxylic acids is not meant to be restrictive but only illustrative; the invention encompasses not only the acids but also the carboxyl-linked derivatives thereof selected from the class consisting of salts, cationic complexes, acyl halides, amides, amidines, nitriles, hydrazides, and esters.

As noted above, in a preliminary step of the synthesis the fluoroketone is reacted with an alkali metal fluoride. As the latter reagent, potassium fluoride is generally preferred, but the fluorides of sodium, cessium, and rubidium may also be used. The reaction is generally conducted in an inert solvent for the ketone, for example, acetonitrile, dioxane, tetrahydrofuran, tetramethylene sulphone, diglyme (an abbreviated name for dimethyl ether of diethylene glycol), etc. The alkali metal fluoride is only slightly soluable in these solvents and the disappearance of undispersed alkali metal fluoride during the reaction supplies a useful indication of formation of the desired intermediate (which is soluble). The temperature of reaction is not critical. Usually, for convenience, the reaction is conducted at room temperature but it does take place at lower or higher temperatures. Generally, temperatures over 85° C. are avoided to minimize decomposition of the intermediate. Where the starting ketone is a gas (for example, hexafluoroacetone) it is preferred to cool the system first to get the ketone into solution. Then, the temperature can be increased—for example, allowed to warm to room temperature—to accelerate the reaction. To prevent hydrolysis of the intermediate, the reaction is conducted under anhydrous conditions. It is also helpful to remove air (which may contain moisture) by flushing the reaction vessel with dry, inert gas such as nitrogen. When the intermediate is formed—as evidenced by disappearance of undissolved alkali metal fluoride—the system is ready for further treatment. The fluorocarbinolate intermediate is not isolated but employed just as it is formed. Thus, to form the desired ester, a selected omega-haloaliphatic acid ester is added and the mixture stirred. The temperature is not critical and may range, for example, from room temperature to 100° C. The product is recovered from the system by adding water and separating the organic phase from the aqueous phase containing dissolved alkali metal salt. The organic phase may then be dried and the product separated by distillation. In the alternative, reaction mixture may be filtered to remove alkali metal salt and the product isolated by distillation.

In forming the esters of the invention, the fluorocarbinolate is reacted with any desired omega-haloaliphatic acid ester of the following general structure $$X-(CH_2)_m-COOR'$$

wherein X is Cl, Br, I, or F; $m$ is an integer from 1 to 20; R′ is a monovalent hydrocarbyl group, for example, alkyl, cycloalkyl, alkenyl, alkaryl, or aryl. Representative examples of such reactants include the following: The methyl, ethyl, isopropyl, butyl, cyclohexyl, allyl, benzyl, phenyl, toly, etc. esters of omega-haoaliphatic acids such as: chloro-,bromo-, or iodoacetic acid; 3-bromopropionic acid; 4-bromobutyric acid; 5-bromovaleric acid; 6-bromocaproic acid; 8-bromocaprylic acid; 10-bromocapric acid; 11-bromoundecanoic acid; 12-bromolauric acid; 16-bromopalmitic acid; 18-bromostearic acid; and the like. As above noted, the omega halogen may be iodine, bromine, chlorine, or fluorine. However, maximum yields are obtained when the omega-bromo or omega-iodo derivatives are employed. It is also within the broad purview of the invention to use haloalkyl esters which have a halogen atom adjacent to the terminal carbon atom, i.e.,

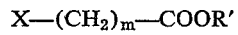

$$CH_3-\underset{X}{CH}-(CH)_{m-1}-COOR'$$

wherein X, $m$, and R′ are as above defined. The preferred structures, nevertheless, contain the halogen atom on a terminal carbon as indicated hereinabove.

As noted above, the compounds of the invention are useful for improving the properties of fibrous materials. Typical of such materials are paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, card, tape, woven or knitted fabrics, felts or other nonwoven fabrics, garments or garment parts.

Examples

The invention is further demonstrated by the following illustrative examples. The various tests described in the examples were carried out as described below:

Oil Repellency: The 3M oil-repellency test described by Grajeck and Petersen, Textile Research Journal, 32, pages 320–331, 1962. Ratings are from 0 to 150, with the higher values signifying the greater resistance to oil penetration.

Water Repellency: AATC spray test, method 22—1952. Ratings are from 0 to 100 with the higher values signifying greater resistance to water penetration.

Example I.—Ethyl 11-(heptafluoro-isopropoxy)undecanoate

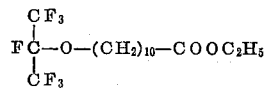

$$\underset{\underset{CF_3}{|}}{\overset{\overset{CF_3}{|}}{F C}}-O-(CH_2)_{10}-COOC_2H_5$$

Anhydrous potassium fluoride (25 g.) and 250 ml. diglyme were introduced into a three-neck flash equipped with gas inlet tube, magnetic stirring bar, and Dry Ice reflux condenser. The contents of the flash were cooled in Dry Ice-acetone and 72 g. hexafluoroacetone (0.4 mole) was introduced through the gas inlet tube. The flash was allowed to warm to room temperature while the contents were stirred. After approximately 3 hrs., the potassium alcoholate

$$\underset{\underset{CF_3}{|}}{\overset{\overset{CF_3}{|}}{F C}}-OK$$

had formed as evidenced by the disappearance of KF from the suspension, leaving a clear solution.

The Dry Ice-condenser was replaced with a water-cooled condenser and 112 g. (0.4 mole) ethyl 11-bromoundecanoate was added in one shot to the flask. The reaction mixture was stirred and heated to 80–85° C. Heating was continued for 72 hours, during which time KBr precipitated out of the solution. Recovery of ca. 50 g. of KBr indicated complete conversion of the bromoester. The reaction mixture was poured into ice-water and the lower fluorocarbon layer (111 grams—70% yield) collected, washed twice with 50-ml. portions of water and dried. Distillation in vacuo gave the product as a colorless liquid which boiled at 257° C./760 mm.; $N_D^{23}$ 1.3949.

Analysis.—Calc. for $C_{16}H_{25}O_3F_7$: C, 48.23; H, 6.33; F, 33.39. Found: C, 48.44; H, 6.45; F, 30.4.

The infrared and NMR spectra were in accordance with the above structure.

Example II.—Methyl 5-(heptafluoro-isopropoxy) valerate

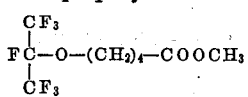

The compound was prepared in a manner similar to that given in Example I, using

| | |
|---|---|
| Potassium fluoride | g. 18.2 |
| Diglyme | ml. 200 |
| Hexafluoroacetone | g. 51.2 |
| Methyl 5-bromovalerate | g. 60 |

The product (56 g., 62% yield) was obtained as a clear liquid, B.P. 167° C./760 mm., $N_D^{23}$ 1.3463.

*Analysis.*—Calc. for $C_9H_{11}O_3F_7$: C, 36.01; H, 3.69; F, 44.31. Found: C, 35.96; H, 3.74; F, 43.4.

The infrared and NMR spectra were in accordance with the above structure.

Example III.—Methyl 5-(β-chlorohexafluoro-isopropoxy)valerate

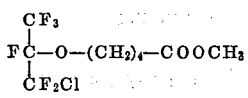

The ester was prepared in a manner similar to that given in Example I, using

| | |
|---|---|
| Potassium fluoride | g. 3.0 |
| Diglyme | ml. 50 |
| Monochloropentafluoroacetone | g. 9.3 |
| Methyl 5-bromovalerate | g. 10 |

The product had a B.P. of 183° C, at 760 mm., $N_D^{23}$ 1.4148.

*Analysis.*—Calc. for $C_9H_{11}O_3F_6Cl$: F, 36.07. Found: F, 35.8.

Example IV.—Methyl 5-(β,β′-dichloropentafluoro-isopropoxy)valerate

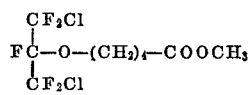

The ester was prepared in a manner similar to that given in Example I, using

| | |
|---|---|
| Potassium fluoride | g. 3.0 |
| Diglyme | ml. 50 |
| Sym-dichlorotetrafluoroacetone | g. 10.2 |
| Methyl 5-bromovalerate | g. 10 |

The product had a B.P. of 190° C. at 760 mm.

Example V.—Methyl 4-(heptafluoro-isopropoxy)butyrate

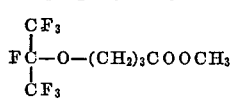

The ester was prepared in a manner similar to that given in Example I from 0.1 mole each of potassium fluoride, hexafluoroacetone, and methyl 5-bromobutyrate.

Yield of the product was 82%, B.P. 197° C. at 760 mm.

Example VI.—Sodium 11-(heptafluoroisopropoxy) undecanoate

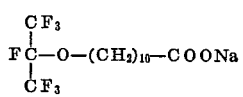

Five grams of ethyl 11-(heptafluoroisopropoxy)undecanoate, prepared as described in Example I, was hydrolized by refluxing for one hour with an equivalent amount of 10% aqueous NaOH. The resulting sodium salt was precipitated from the solution by addition of acetone.

After the recovered salt was vacuum dried overnight at 100° C., surface tension measurements were made on aqueous solutions thereof. The results are tabulated below:

| Conc. of salt at 24° C. in g./100 ml. | Surface tension (dynes/cm.) |
|---|---|
| .437 | 18.7 |
| .218 | 18.9 |
| .109 | 21.1 |
| .055 | 23.3 |
| .027 | 25.4 |
| .014 | 27.9 |
| .007 | 28.9 |
| .0035 | 31.1 |
| .0017 | 34.7 |
| .0008 | 42.3 |
| .0004 | 58.5 |
| .0002 | 67.5 |
| Water | 70.5 |

Conventional surfactants, including salts of fatty acids, do not lower the surface tension of water below 26 dynes/cm.

Example VII.—11-(heptafluoroisopropoxy)undecanoic acid

Sodium 11-(heptafluoroisopropoxy)undecanoate, prepared as described in Example VI, was acidified with an excess of HCl. The organic layer which separated was removed and the remaining water layer washed with ether. The ether layer was added to the organic phase and the mixture dried over $CaSO_4$. The ether was then removed and the product flash distilled, giving a clear liquid, B.P. 269° C./760 mm., $N_D^{23}$ 1.3959.

Example VIII.—5-(heptafluoroisopropoxy)valeric acid

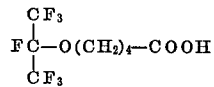

Methyl 5-heptafluoroisopropoxy)valerate, prepared as described in Example II, was saponified by refluxing with an equivalent amount of 10% aqueous NaOH. The resulting sodium salt was isolated as in Example VI and acidified with 6 N HCl. The organic phase was removed and the aqueous phase washed with ether. The ether and organic phase were combined and dried over $CaSO_4$. Distillation gave the pure acid product, B.P. 210° C. at 760 mm., $N_D^{23}$ 1.3489.

Example IX.—11-(heptafluoroisopropoxy)undecanoyl chloride

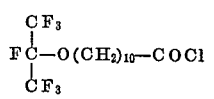

One gram of 11-(heptafluoroisopropoxy)undecanoic acid was heated with an excess of thionyl chloride for one hour. Excess thionyl chloride was removed by distillation. The pure acid chloride was obtained by distillation on a micro-distillation apparatus, B.P. 210° C., $N_D^{23}$ 1.3958.

Having thus described the invention, what is claimed is:

1. A fluorinated aliphatic carboxylic acid of the structure

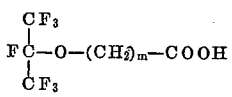

wherein *m* is an integer from 1 to 20.

2. A fluorinated aliphatic carboxylic acid of the structure

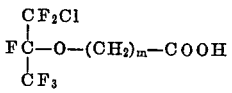

wherein *m* is an integer from 1 to 20.

3. A fluorinated aliphatic carboxylic acid of the structure $$\underset{\underset{CF_2Cl}{|}}{\overset{\overset{CF_2Cl}{|}}{FC}}-O-(CH_2)_m-COOH$$

wherein $m$ is an integer from 1 to 20.

4. An acyl halide of the structure $$\underset{\underset{CF_3}{|}}{\overset{\overset{CF_3}{|}}{FC}}-O-(CH_2)_m-COX$$

wherein X is a halogen, and $m$ is an integer from 1 to 20.

5. An acyl halide of the structure $$\underset{\underset{CF_3}{|}}{\overset{\overset{CF_2Cl}{|}}{FC}}-O-(CH_2)_m-COX$$

wherein X is a halogen, and $m$ is an integer from 1 to 20.

6. An acyl halide of the structure $$\underset{\underset{CF_2Cl}{|}}{\overset{\overset{CF_2Cl}{|}}{FC}}-O-(CH_2)_m-COX$$

wherein X is a halogen, and $m$ is an integer from 1 to 20.

7. An alkali metal salt of the structure $$\underset{\underset{CF_3}{|}}{\overset{\overset{CF_3}{|}}{FC}}-O-(CH_2)_m-COOM$$

wherein M is an alkali metal, and $m$ is an integer from 1 to 20.

8. An alkali metal salt of the structure $$\underset{\underset{CF_3}{|}}{\overset{\overset{CF_2Cl}{|}}{FC}}-O-(CH_2)_m-COOM$$

wherein M is an alkali metal, and $m$ is an integer from 1 to 20.

9. An alkali metal salt of the structure $$\underset{\underset{CF_2Cl}{|}}{\overset{\overset{CF_2Cl}{|}}{FC}}-O-(CH_2)_m-COOM$$

wherein M is an alkali metal, and $m$ is an integer from 1 to 20.

10. An ester of the structure $$\underset{\underset{CF_3}{|}}{\overset{\overset{CF_3}{|}}{FC}}-O-(CH_2)_m-COOR'$$

wherein R' is a monovalent hydrocarbon radical, and $m$ is an integer from 1 to 20.

11. An ester of the structure $$\underset{\underset{CF_3}{|}}{\overset{\overset{CF_2Cl}{|}}{FC}}-O-(CH_2)_m-COOR'$$

wherein R' is a monovalent hydrocarbon radical, and $m$ is an integer from 1 to 20.

12. An ester of the structure $$\underset{\underset{CF_2Cl}{|}}{\overset{\overset{CF_2Cl}{|}}{FC}}-O-(CH_2)_m-COOR'$$

wherein R' is a monovalent hydrocarbon radical, and $m$ is an integer from 1 to 20.

References Cited

UNITED STATES PATENTS 3,145,222   8/1964   Brace _____ 260—408
3,172,910   3/1965   Brace _____ 260—408

ALTON D. ROLLINS, *Primary Examiner.*

R. J. GALLAGHER, *Assistant Examiner.*